US008359459B2

(12) United States Patent  
Gove

(10) Patent No.: US 8,359,459 B2
(45) Date of Patent: Jan. 22, 2013

(54) USING HARDWARE SUPPORT TO REDUCE SYNCHRONIZATION COSTS IN MULTITHREADED APPLICATIONS

(75) Inventor: Darryl J. Gove, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 991 days.

(21) Appl. No.: 12/127,509

(22) Filed: May 27, 2008

(65) Prior Publication Data

US 2009/0300643 A1     Dec. 3, 2009

(51) Int. Cl.
*G06F 9/44* (2006.01)
(52) U.S. Cl. ......................... 712/220; 718/105
(58) Field of Classification Search .................. 712/220; 718/105
See application file for complete search history.

(56) References Cited

U.S. PATENT DOCUMENTS

| | | | |
|---|---|---|---|
| 5,349,682 A * | 9/1994 | Rosenberry | 718/102 |
| 5,515,538 A | 5/1996 | Kleiman | |
| 5,765,151 A | 6/1998 | Senator | |
| 5,923,878 A | 7/1999 | Marsland | |
| 5,991,790 A | 11/1999 | Shah et al. | |
| 6,470,329 B1 | 10/2002 | Livschitz | |
| 6,842,857 B2 | 1/2005 | Lee et al. | |
| 7,055,021 B2 | 5/2006 | Kadambi | |
| 7,168,076 B2 | 1/2007 | Chaudhry et al. | |
| 7,240,160 B1 | 7/2007 | Hetherington et al. | |
| 7,444,499 B2 | 10/2008 | Davis et al. | |
| 7,487,327 B1 | 2/2009 | Chang et al. | |
| 7,650,485 B1 | 1/2010 | Chou | |
| 7,685,354 B1 | 3/2010 | Hetherington et al. | |
| 7,702,887 B1 | 4/2010 | Grohoski et al. | |
| 7,953,778 B2 | 5/2011 | McKenney et al. | |
| 2005/0240666 A1 * | 10/2005 | Xu et al. | 709/223 |
| 2006/0085580 A1 * | 4/2006 | Gupta et al. | 710/260 |
| 2006/0225074 A1 * | 10/2006 | Vaid et al. | 718/102 |
| 2007/0094671 A1 * | 4/2007 | Stephens et al. | 718/105 |
| 2008/0077921 A1 * | 3/2008 | Chaudhary et al. | 718/100 |
| 2010/0115236 A1 * | 5/2010 | Bataineh et al. | 712/29 |

\* cited by examiner

*Primary Examiner* — Jacob Petranek
(74) *Attorney, Agent, or Firm* — Rory D. Rankin; Meyertons, Hood, Kivlin, Kowert & Goetzel, P.C.

(57) ABSTRACT

A processor configured to synchronize threads in multi-threaded applications. The processor includes first and second registers. The processor stores a first bitmask in the first register and a second bitmask in the second register. For each bitmask, each bit corresponds with one of multiple threads. A given bit in the first bitmask indicates the corresponding thread has been assigned to execute a portion of a unit of work. A corresponding bit in the second bitmask indicates the corresponding thread has completed execution of its assigned portion of the unit of work. The processor receives updates to the second bitmask in the second register and provides an indication that the unit of work has been completed in response to detecting that for each bit in the first bitmask that corresponds to a thread that is assigned work, a corresponding bit in the second bitmask indicates its corresponding thread has completed its assigned work.

21 Claims, 10 Drawing Sheets

SetGroup Instruction 400

| Opcode 410 | 411 | 412 | 413 | 414 | 415 | 416 | 417 | 418 | Group_ID 419 |

| Bit Field | Parameter |
|---|---|
| 410 | Instruction Opcode identifier |
| 411 | Bit 1 of processor_mask |
| 412 | Bit 1 of processor_mask |
| 413 | Bit 1 of processor_mask |
| 414 | Bit 1 of processor_mask |
| 415 | Bit 1 of processor_mask |
| 416 | Bit 1 of processor_mask |
| 417 | Bit 1 of processor_mask |
| 418 | Bit 1 of processor_mask |
| 419 | Group_ID |

FIG. 4

Done Instruction 600

| Opcode 610 | 611 | 612 | 613 | 614 | 615 | 616 | 617 | 618 | Group_ID 619 |
|---|---|---|---|---|---|---|---|---|---|

| Bit Field | Parameter |
|---|---|
| 610 | Instruction Opcode identifier |
| 611 | Bit 1 of processor_mask |
| 612 | Bit 1 of processor_mask |
| 613 | Bit 1 of processor_mask |
| 614 | Bit 1 of processor_mask |
| 615 | Bit 1 of processor_mask |
| 616 | Bit 1 of processor_mask |
| 617 | Bit 1 of processor_mask |
| 618 | Bit 1 of processor_mask |
| 619 | Group_ID |

FIG. 6

USING HARDWARE SUPPORT TO REDUCE SYNCHRONIZATION COSTS IN MULTITHREADED APPLICATIONS

BACKGROUND OF THE INVENTION

1. Field of the Invention

This invention relates to computer systems and, more particularly, to efficient multi-threaded operation of computer systems.

2. Description of the Related Art

Modern computer systems often utilized multiple processors executing in parallel to increase overall operating efficiency. A variety of configurations are possible including separate microprocessors, a single microprocessor that includes multiple cores, or a combination of the two. When an application requires the execution of a complex task, the task may be separated into several threads with each thread assigned to a different processor or core. As used herein, a thread is a stream of instructions that is executed on a processor.

Many applications are written that use multiple threads to accomplish a single unit of work. For example, a unit of work may be to execute the following loop:

For (i=0; i<N; i++) {a[i]=b[i];}

The range of 0 ... N may be divided among several processors such that each one completes a portion of the total iterations through the loop. Once a given processor completes its work, it may have to wait for the other processors to complete their work before continuing to the next unit of work. If the given processor begins the next unit of work earlier, values that are needed from the other processors may not yet be available or may not yet be set to the values needed to start the next work unit, leading to potentially erroneous results. Consequently delays may be introduced in the operation of one or more processors, reducing overall operating efficiency.

The delays described above may be considered to be a synchronization cost of multi-threaded operation. The degree to which such delays reduce the efficiency of a multi-threaded application depends on the size of the work units that are divided among the available processors. Overall performance may be improved if the synchronization costs are less than the gains available from parallelization of a task. Correspondingly, parallelization of tasks may be effective for any tasks for which the synchronization costs are sufficiently small.

A variety of technologies may be incorporated in a computer system to support multiple threads running in parallel. Some technologies, such as transactional memory, may be most effective for smaller units of work. Unfortunately, a given synchronization cost may generally be proportionately higher for smaller units of work. Therefore, what is needed is systems and methods of reducing synchronization costs in multi-threaded, multi-processor operations.

SUMMARY OF THE INVENTION

Various embodiments of a processor and methods are disclosed. In one embodiment, a processor includes first and second registers. The processor stores a first bitmask in the first register and a second bitmask in the second register. For each of the first and second bitmasks, each bit corresponds with a respective one of a plurality of threads. A given bit in the first bitmask indicates the corresponding thread has been assigned to execute a portion of a unit of work. A corresponding bit in the second bitmask indicates the corresponding thread has completed execution of its assigned portion of the unit of work. The processor receives updates to the second bitmask in the second register and provides an indication that the unit of work has been completed in response to detecting that for each bit in the first bitmask that corresponds to a thread that is assigned work, a corresponding bit in the second bitmask indicates its corresponding thread has completed its assigned work.

In a further embodiment, the processor includes a plurality of cores. Each of the plurality of threads may be executed by a separate one of the plurality of cores. In a still further embodiment, to update the second bitmask in the second register, each of the plurality of threads updates its respective bit in the second register in response to completing its assigned portion of the unit of work.

In a still further embodiment, by executing a single instruction, the processor monitors the first and second registers and returns the indication when the unit of work has been completed. In another embodiment, the processor may change the first bitmask in response to a reassignment of a portion of the unit of work from a first thread to a second thread. In a further embodiment, the processor may store additional bitmasks in additional registers for simultaneously synchronizing a plurality of units of work.

BRIEF DESCRIPTION OF THE DRAWINGS

FIG. 4 illustrates one embodiment of a SetGroup instruction.

FIG. 6 illustrates one embodiment of a Done instruction.

Figure 1:
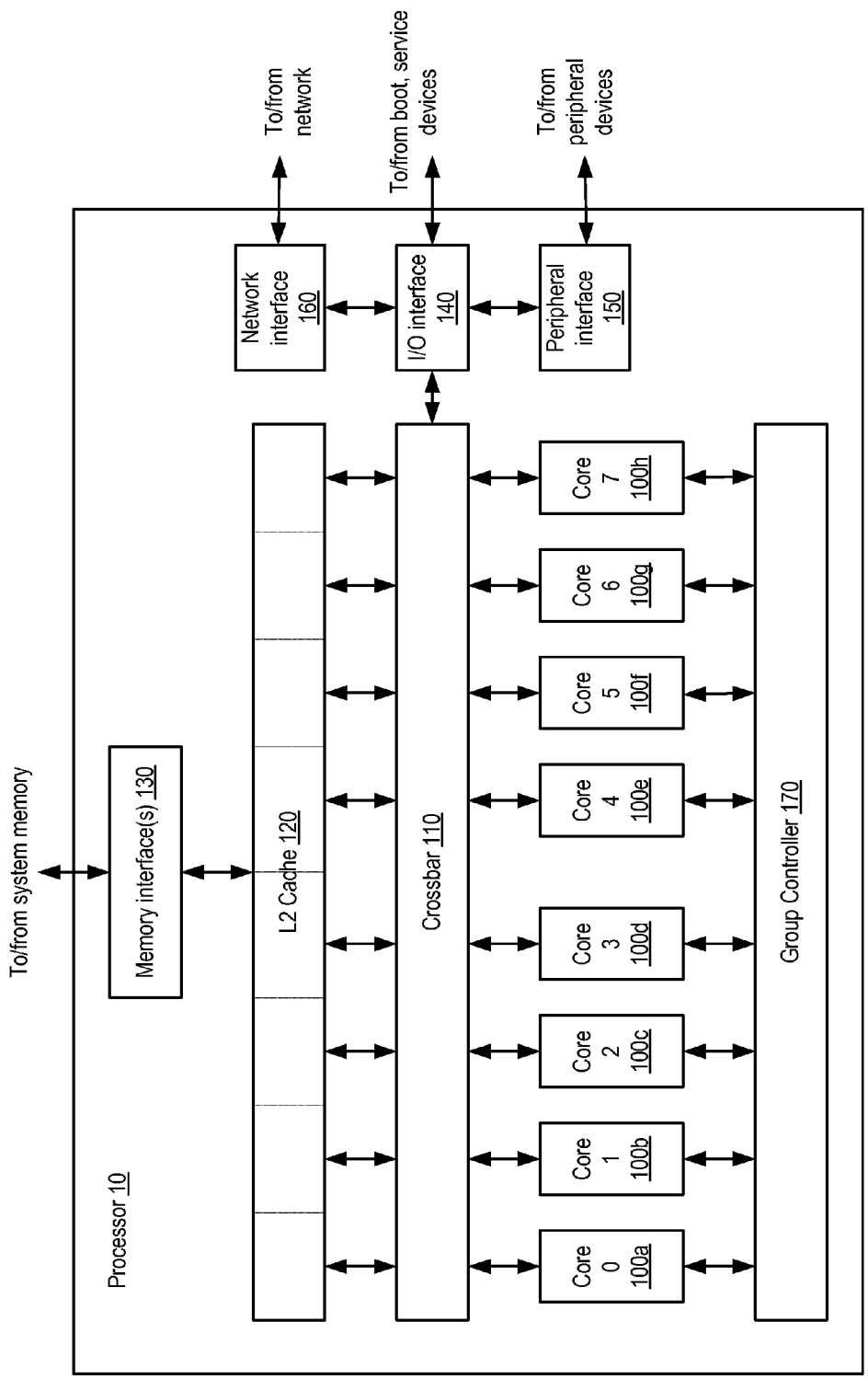
FIG. 1 is a generalized block diagram of one embodiment of a multithreaded processor.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to a group controller 170 and an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the description of FIG. 2, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads. During operation, group controller 170 may be used by cores 100 to coordinate multithreaded instruction execution via processes that will be described further below.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Figure 2:
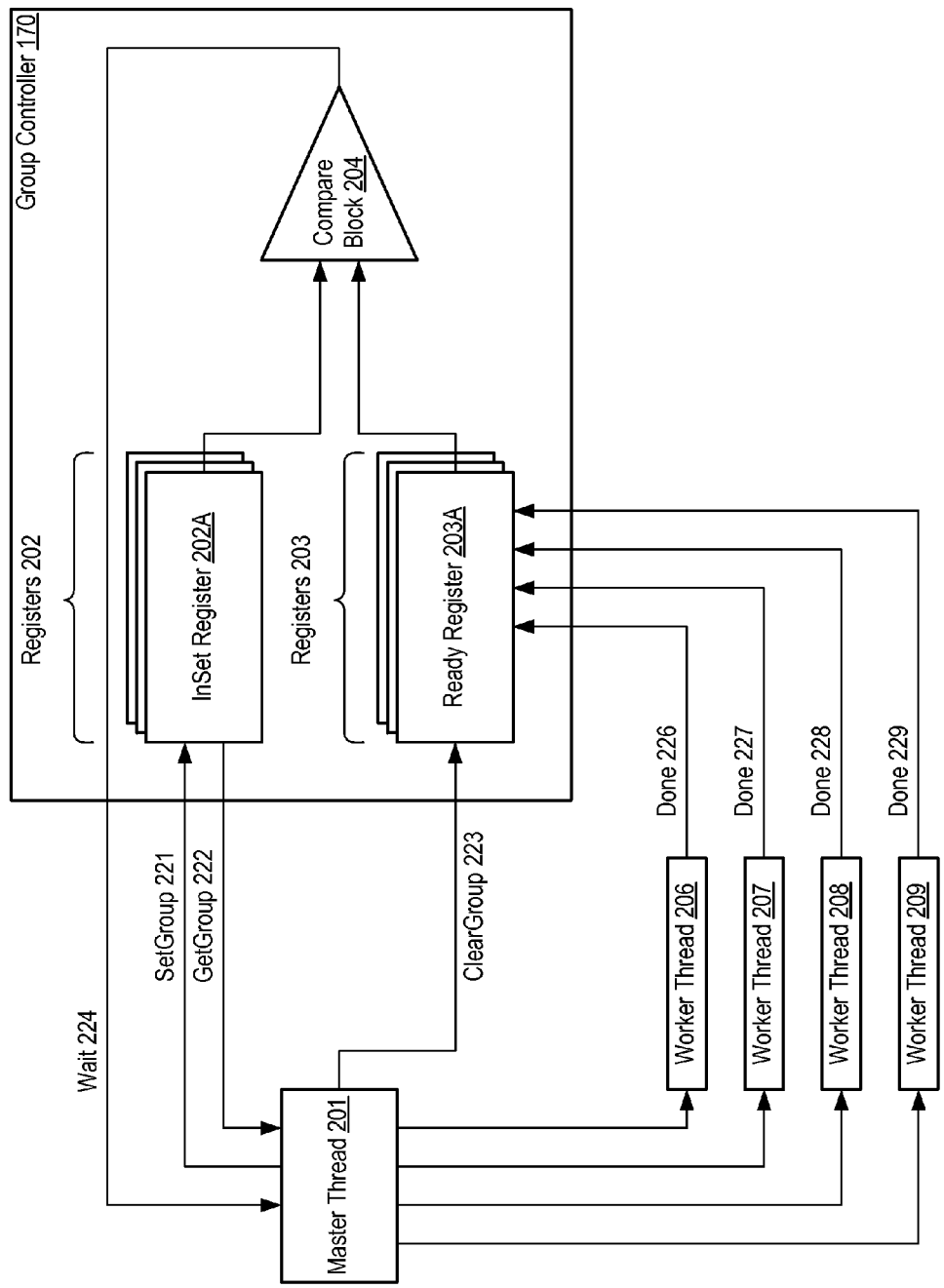
FIG. 2 is a generalized block diagram illustrating one embodiment of a portion of processor including a group controller.

Turning now to FIG. 2, a block diagram illustrating one embodiment of a portion of processor 10 including group controller 170 is shown. In the illustrated embodiment, controller 170 is shown coupled to master thread 201 and worker threads 206-209. Each of threads 201 and 206-209 may be executed by a respective one of cores 100 as part of a group operation. For example, a first core 100a may execute master thread 201. Master thread 201 may assign threads 206-209 to cores 100b-100e, respectively in order to execute a particular unit of work, wherein threads 206-209 may execute in parallel. Threads 201 and 206-209 may utilize group controller 170 to synchronize the parallel thread execution. Hereinafter, to simplify the discussion, units of work may be discussed as being executed by a processor or a core or as being a thread or a portion of a thread. In one embodiment, there may be a one-to-one mapping between threads and processors or cores. However, the invention is not limited to embodiments in which there is such a mapping. A single processor or core may execute more than one thread. Units of work may be tracked by thread, by core, by processor, or some combination of threads, cores, and processors. Numerous alternatives are possible and are contemplated.

Figure 3:
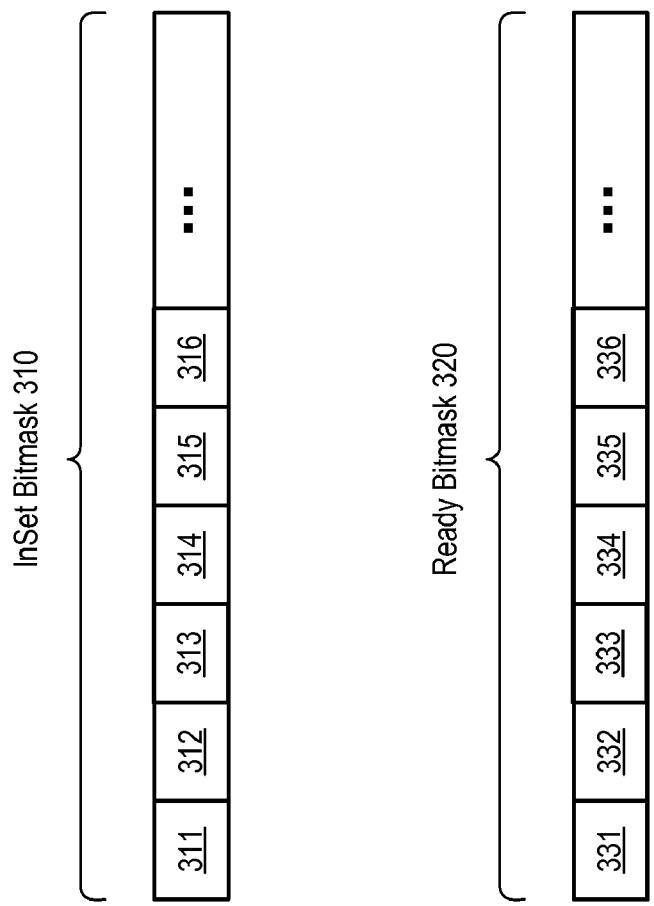
FIG. 3 illustrates one embodiment of a pair of bitmasks that may be used to track the status of individual threads.

In one embodiment, group controller 170 includes a set of registers 202, a set of registers 203, and a compare block 204. In order to synchronize a particular group of threads, one each of registers 202 and 203 may be assigned to the group. In one embodiment, group controller may track the progress of multiple groups through multiple pairs of registers. Each register may include a bitmask in which each bit position corresponds to an individual worker thread. FIG. 3 illustrates one embodiment of a pair of bitmasks 310 and 320 that may be used to track the status of individual threads. InSet bitmask 310 may include bit positions 311-316, etc. Each of bit positions 311-316 may be assigned to a specific thread, wherein the value of the bit indicates whether or not the thread is included in a particular group. For instance, a bit that is set may indicate that the corresponding thread is included in the group. Similarly, Ready bitmask 320 may include bit positions 321-326, etc. Each of bit positions 321-326 may be assigned to a specific thread, wherein the value of the bit indicates whether or not the thread has completed its assigned work for a particular group operation.

Threads 201 and 206-209 may utilize controller 170 through a set of instructions 221-224 and 226-229. The detailed format of these instructions is described below. Generally speaking, a master thread may issue a SetGroup instruction 221 to designate which threads are included in a group. SetGroup instruction 221 may write the bit values of InSet bitmask 310 to an Inset Register 202, such as register 202A. A master thread may also issue a corresponding GetGroup instruction 222 to read back the values that are stored in an Inset Register 202 by a SetGroup instruction. A master thread may issue a ClearGroup instruction 223 to clear the values stored in a Ready Register 203, such as register 203A. A master thread may issue a Wait instruction 224 to cause comparator block 204 to perform a comparison between the values stored in an Inset Register 202 with the values stored in a corresponding Ready Register 203 and return a predetermined value when the registers have matching bit values. Each of the threads in a particular group may set its corresponding bit value in a Ready Register 203 by issuing a Done instruction such as instructions 226-229.

FIG. 4 illustrates one embodiment of a SetGroup instruction 400. In the illustrated embodiment, SetGroup instruction 400 includes an opcode 410, bits 411-418, and a group_ID field 419. Opcode 410 may be a field whose value uniquely identifies the SetGroup instruction among the instructions of a particular ISA. Group_ID field 419 may be a field whose value uniquely identifies a particular pair of registers 202 and 203 that are to be used by a group of threads during parallel execution of a group of instructions. Bits 411-418 may be used to designate particular processors, cores, or threads that are expected to participate in parallel execution of the group of instructions. More specifically, each participating processor, core, or thread may be assigned a respective one of bits 411-418. Hereinafter, to simplify the discussion, bit-fields and bitmasks such as bits 411-418 may be described as referring to participating processors and may be further described as belonging to a processor mask. It is to be understood that in various embodiments, these bits may correspond to a processor, a core, a thread, or a combination thereof. By way of example only, eight bits are used by SetGroup instruction 400 to designate participating processors. In alternative embodiments more or fewer than eight bits may be included in a SetGroup instruction to designate participating processors.

A GetGroup instruction (not shown) that corresponds with SetGroup instruction 400 may also be provided through which a thread may read the values of bits 411-418. It will be apparent to one of ordinary skill in the art that a GetGroup instruction may include an opcode and a group_ID field that correspond to opcode 410 and a group_ID field 419 of SetGroup instruction 400. During operation, a processor may execute SetGroup instruction 400 to write the values of InSet bitmask 310 into the register 202 that is designated by group_ID 410. Similarly, a processor may execute a GetGroup instruction to read the values of InSet bitmask 310 from a register 202 that is designated by a particular group_ID.

Figure 5:
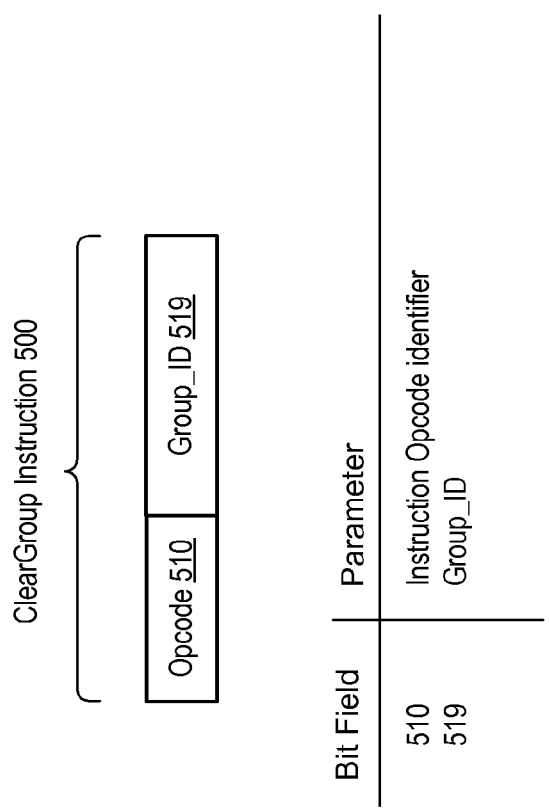
FIG. 5 illustrates one embodiment of a ClearGroup instruction.

FIG. 5 illustrates one embodiment of a ClearGroup instruction 500. In the illustrated embodiment, ClearGroup instruction 500 includes an opcode 510 and a group_ID field 519. Opcode 510 may be a field whose value uniquely identifies the ClearGroup instruction among the instructions of a particular ISA. Group_ID field 519 may be a field whose value uniquely identifies a particular pair of registers 202 and 203 that are to be used by a group of threads during parallel execution of a group of instructions. During operation, a processor may execute ClearGroup instruction 500 to clear all of the bits of the register 203 that is designated by group_ID 510 that correspond with participating processors.

FIG. 6 illustrates one embodiment of a Done instruction 600. In the illustrated embodiment, Done instruction 600 includes an opcode 610, bits 611-618, and a group_ID field 619. Opcode 610 may be a field whose value uniquely identifies the Done instruction among the instructions of a particular ISA. Group_ID field 619 may be a field whose value uniquely identifies a particular register 203 that is to be used by participating processors to report their status during parallel execution of a group of instructions. Individual, participating processors may use bits 611-618 to report their status. Collectively, bits 611-618 may be referred to as a processor mask. More specifically, each participating processor may be set a respective one of bits 611-618 by issuing a Done instruction. To indicate completion of an assigned unit of work, a processor may execute Done instruction 600 to set its corresponding bit within the register 203 that is designated by group_ID 610.

Figure 7:
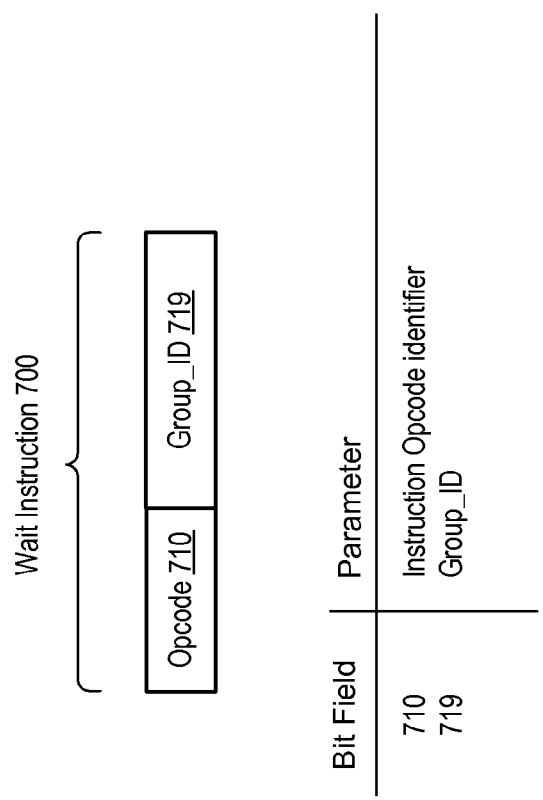
FIG. 7 illustrates one embodiment of a Wait instruction.

FIG. 7 illustrates one embodiment of a Wait instruction 700. In the illustrated embodiment, Wait instruction 700 includes an opcode 710 and a group_ID field 719. Opcode 710 may be a field whose value uniquely identifies the Wait instruction among the instructions of a particular ISA. Group_ID field 719 may be a field whose value uniquely identifies a particular pair of registers 202 and 203 that are to be compared to determine the completion of parallel execution of a group of instructions.

Figure 8:
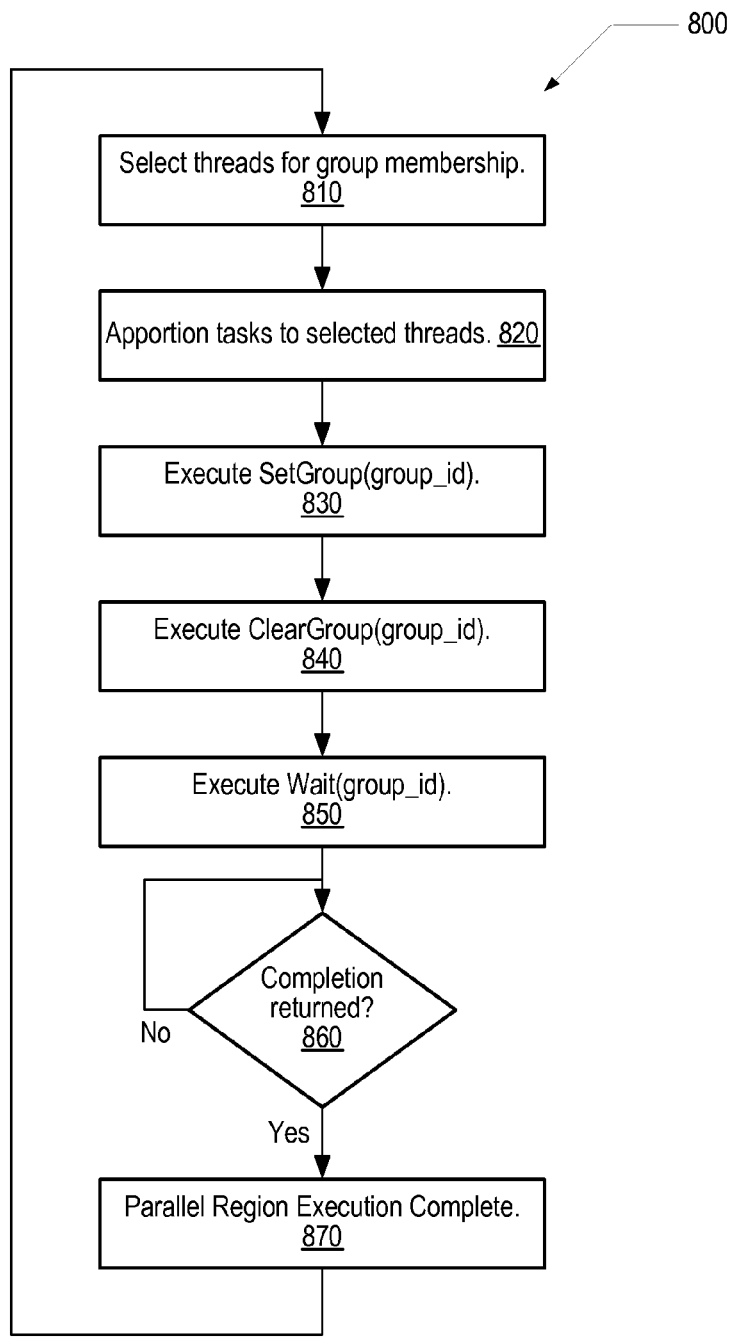
FIG. 8 illustrates one embodiment of a process that may be used by a processor to track the progress of a group of threads executing in parallel.

FIG. 8 illustrates one embodiment of a process 800 that may be used by a processor to track the progress of a group of threads executing in parallel. It is noted that in alternative embodiments, the individual blocks illustrated in process 800 that are described in detail below may be executed in a different order and/or that some blocks may be executed in parallel with others. Process 800 may begin with selection of a group of threads to execute a unit of work (block 810). Once the members of the group have been selected, each thread may be assigned a portion of the unit of work to execute (block 820). Next, a SetGroup instruction may be executed (block 830). In one embodiment, a SetGroup instruction may include a group_ID and a bitmask. The group_ID may have a value identifying the group. Each bit that is set in the bitmask may indicate that a corresponding thread expected to participate in the group. Once the SetGroup instruction has been executed, a ClearGroup instruction may be executed (block 840). In one embodiment, a ClearGroup instruction may include a group_ID that may be used to identify the group. When the ClearGroup instruction is executed, each bit in a Ready register identified by the group_ID may be cleared. Once the ClearGroup instruction has been executed, a Wait instruction may be executed (block 850). In one embodiment, a Wait instruction may include a group_ID that may be used to identify the group. After execution of a Wait instruction, if one or more participating threads have not completed their assigned portion of the unit of work (decision block 860), no return will be received. Once all of the participating threads have completed their assigned portion of the unit of work, a completion may be returned indicating that parallel execution of the unit of work is complete (block 870). Upon completion of the unit of work, flow may return to block 810 and process 800 may be repeated any number of times for additional units of work.

Figure 9:
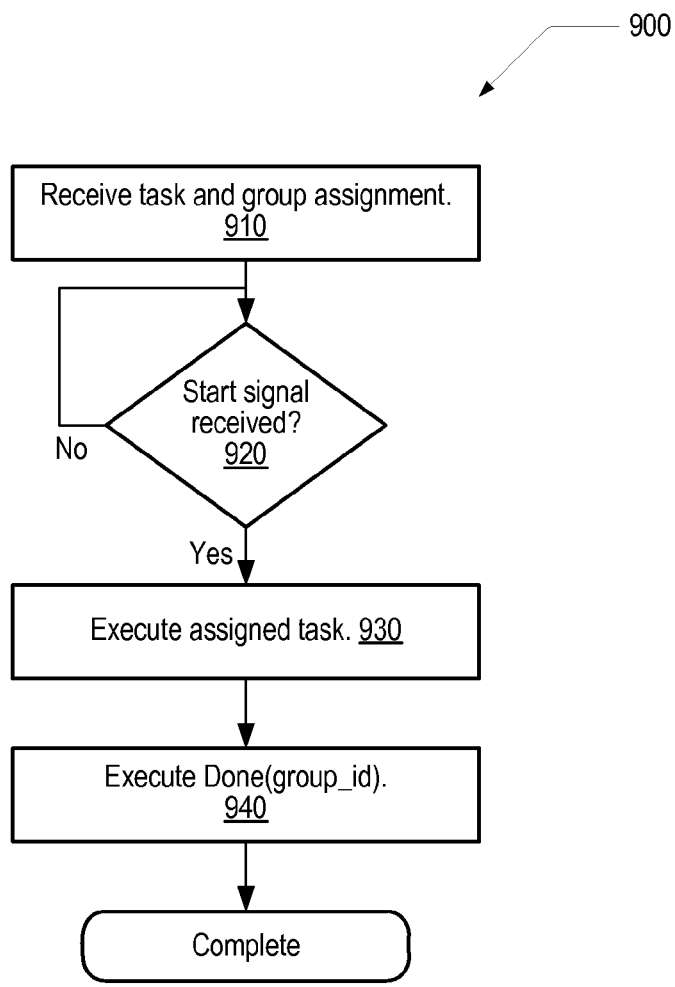
FIG. 9 illustrates one embodiment of a process that may be used to report the progress of an individual thread among a group of threads executing in parallel.

FIG. 9 illustrates one embodiment of a process 900 that may be used to report the progress of an individual thread among a group of threads executing in parallel. It is noted that in alternative embodiments, the individual blocks illustrated in process 900 that are described in detail below may be executed in a different order and/or that some blocks may be executed in parallel with others. In one embodiment, each thread that is participating in a group may execute process 900. Process 900 may begin when a thread receives a task and a group assignment (block 910). Once a task and group assignment have been received, a thread may wait to receive a start signal (decision block 920). In one embodiment, a start signal may be triggered by execution of a ClearGroup instruction. When a start signal is received, the assigned task may be executed (block 930). When the assigned task has been completed, a Done instruction may be executed (block 940). In one embodiment, a Done instruction may include a group_ID that may be used to identify the group. After execution of the Done instruction, process 900 is complete.

Figure 10:
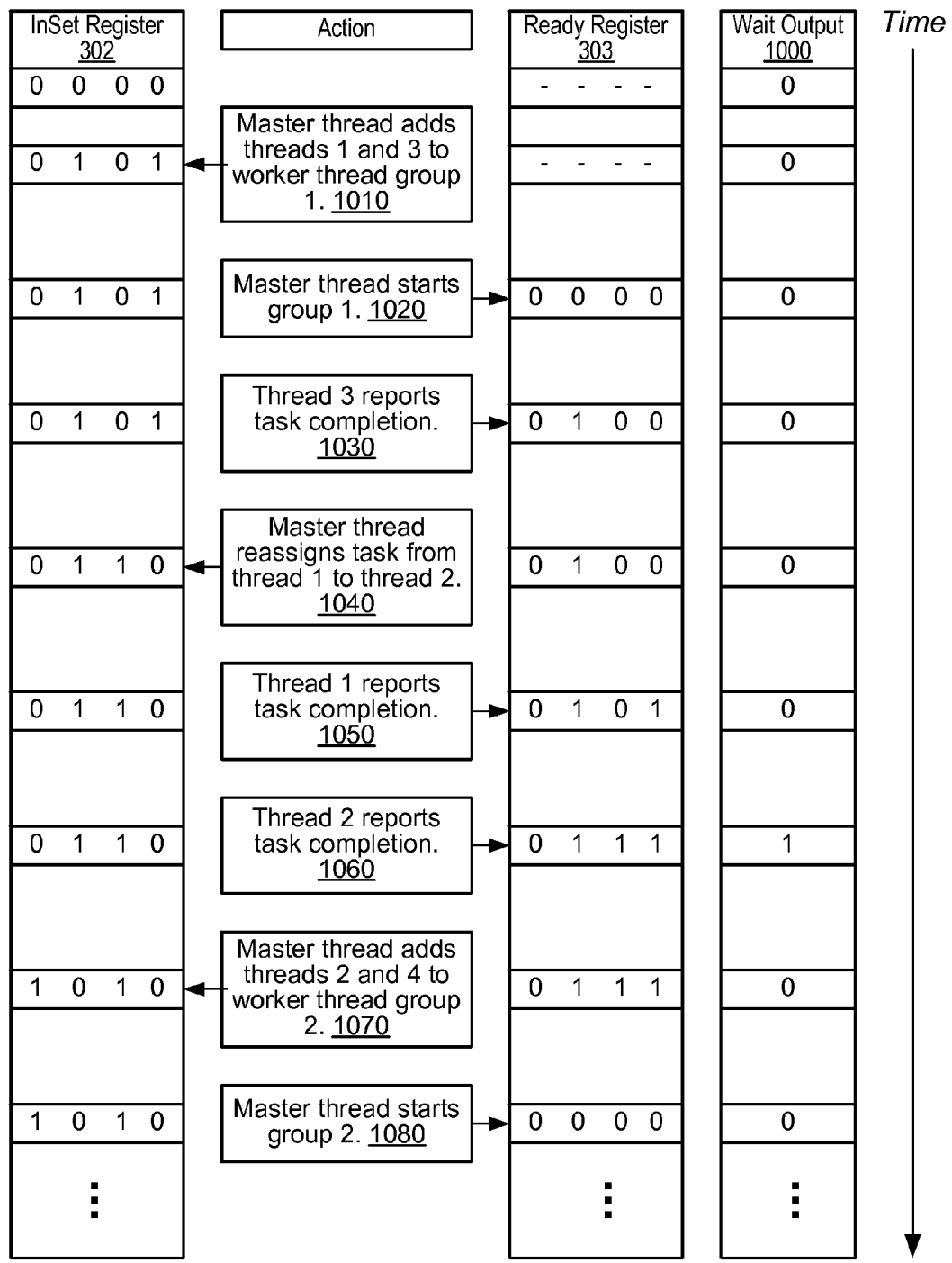
FIG. 10 is a sequence diagram illustrating values stored in one embodiment of a pair of registers that may be used to track parallel thread execution.

FIG. 10 is a sequence diagram illustrating values stored in one embodiment of a pair of registers that may be used to track parallel thread execution. InSet register 302 and Ready register 303 are shown, each including four bit positions that represent four threads that may participate in executing a unit of work, also referred to as a group operation. Also shown is a wait output 1000 whose value indicates that status of the parallel execution of a particular unit of work. In the illustration, time proceeds from top to bottom and specific actions are illustrated at various points in time as numbered blocks. Although each of registers 203 and 204 is shown to include four bits, more or fewer than four bits may be included in alternative embodiments. In addition, a particular unit of work may be executed by any number of threads up to and including the number of bits in registers 302 and 303, i.e., it is not necessary for all of the bits of registers 302 and 303 to be used by participating threads. For purposes of discussion, bit positions in registers 302 and 303 may be numbered from right to left, i.e. the rightmost bit position may correspond to thread 1, the next bit position to thread 2, etc., and the leftmost bit position to thread 4.

It is noted that which threads are participating in a group may change dynamically during a group operation. For example, if a first participating thread is needed to perform a high priority task that is not part of the group operation and there is an idle second thread available, the task assigned to the first thread may be transferred to the second thread via a context switch. The values of registers 302 and 303 that result when a context switch occurs will be illustrated in the example presented below.

The following example illustrates the values of registers 302 and 303 during a first group operation in which a context switch occurs as well as the transition to a second group operation. Initially, register 302 may have a value of '0000,' indicating that there are no participating threads for which status is being tracked. The value of register 303 is not applicable until a group operation begins and the value of wait output 1000 is '0.' A master thread may add threads 1 and 3 to a worker thread group 1 and write a value of '0101' into register 302 (block 1010). The value of wait output 1000 remains '0.' The master thread may then start group 1 execution and write a value of '0000' into register 303 (block 1020). The value of wait output 1000 remains '0.' In the illustrated example, thread 3 completes its assigned task first and reports its completion by writing a '1' to its corresponding bit position in register 303 (block 1030). The value of wait output 1000 remains '0.' Next a context switch occurs. The master thread may reassign a task from thread 1 to thread 2 and write a value of '0110' into register 302 (block 1040). The value of wait output 1000 remains '0.' In the illustrated example, thread 1 no longer has a pending task to complete as part of the group 1 operation and reports its status by writing a '1' to its corresponding bit position in register 303 (block 1050). The value of register 303 changes to '0101.' Note, however, that because of the change made to the value of register 302, the value of wait output 1000 continues to be '0.' Next, thread 2 completes its assigned task and reports its completion by writing a '1' to its corresponding bit position in register 303 (block 1060). As a result, the value of wait output 1000 changes to '1' because all of the bits in register 303 that corresponds to set bits in register 302 are also set. It is noted that the value of bit 1 in register 303 is not applicable to the comparison after bit 1 in register 302 is cleared at block 1050. In alternative embodiments, block 1050 may be omitted, that is, a thread that is removed from a group may be configured not to report that its task is complete.

A second group operation may begin as shown when a master thread adds threads 2 and 4 to a worker thread group 2 and writes a value of '1010' into register 302 (block 1070). The value of wait output 1000 changes to '0.' The master thread may then start group 2 execution and write a value of '0000' into register 303 (block 1080), etc. as described above.

It is noted that the above-described embodiments may comprise software. For example, the functionality of processor 10 may be implemented in hardware, software, firmware, or some combination of the above. In such embodiments, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for synchronizing multi-threaded operations in a processor, the method comprising:
    dividing a unit of work into a plurality of portions;
    assigning each of the plurality of portions to a separate thread of a group of threads;
    assigning a first register and a second register to the group, and
    storing a first bitmask in a first register and a second bitmask in a second register, wherein a given bit in the first bitmask indicates a corresponding thread of the group of threads has been assigned to execute one of said portions, and a corresponding bit in the second bitmask indicates the corresponding thread has completed execution of its assigned portion;
    each thread of the group of threads providing updates to the second bitmask in the second register; and
    determining that the unit of work has been completed in response to detecting that for each bit in the first bitmask that corresponds to a thread that is assigned a portion of the plurality of portions, a corresponding bit in the second bitmask indicates its corresponding thread has completed execution of its assigned portion of the unit of work.

2. The method as recited in claim 1, wherein the processor comprises a plurality of processor cores.

3. The method as recited in claim 2, wherein each thread of the group of threads is executed by a separate one of the plurality of processor cores.

4. The method as recited in claim 1, wherein providing updates to the second bitmask in the second register comprises each thread of the group of threads updating its respective bit in the second register in response to completing its assigned portion of the unit of work.

5. The method as recited in claim 1, further comprising providing a single instruction that, when executed, causes the processor to:
    monitor the first and second registers; and
    return the indication when the unit of work has been completed.

6. The method as recited in claim 1, further comprising changing the first bitmask in response to a reassignment of a portion of the unit of work from a first thread to a second thread.

7. The method as recited in claim 1, further comprising storing additional bitmasks in additional registers for simultaneously synchronizing a plurality of units of work.

8. The method as recited in claim 1, wherein each bit within each of said first bitmask and said second bitmask corresponds to a different thread.

9. A processor comprising first and second registers, wherein the processor is configured to:
    divide a unit of work into a plurality of portions;
    assign each of the plurality of portions to a separate thread of a group of threads;
    assign a first register and a second register to the group, and
    store a first bitmask in a first register and a second bitmask in a second register, wherein a given bit in the first bitmask indicates a corresponding thread of the group of threads has been assigned to execute one of said portions, and a corresponding bit in the second bitmask indicates the corresponding thread has completed execution of its assigned portion;
    each thread of the group of threads providing updates to the second bitmask in the second register; and
    determine that the unit of work has been completed in response to detecting that for each bit in the first bitmask that corresponds to a thread that is assigned a portion of the plurality of portions, a corresponding bit in the second bitmask indicates its corresponding thread has completed execution of its assigned portion of the unit of work.

10. The processor as recited in claim 9, further comprising a plurality of processor cores.

11. The processor as recited in claim 10, wherein each thread of the group of threads is executed by a separate one of the plurality of processor cores.

12. The processor as recited in claim 9, wherein to provide updates to the second bitmask in the second register, each thread of the group of threads is configured to update its respective bit in the second register in response to the completing its assigned portion of the unit of work.

13. The processor as recited in claim 9, wherein by executing a single instruction, the processor is configured to:
    monitor the first and second registers; and
    return the indication when the unit of work has been completed.

14. The processor as recited in claim 9, wherein the processor is further configured to change the first bitmask in response to a reassignment of a portion of the unit of work from a first thread to a second thread.

15. The processor as recited in claim 9, wherein the processor is further configured to store additional bitmasks in additional registers for simultaneously synchronizing a plurality of units of work.

16. A non-transitory computer-readable media storing a plurality of instructions that, when executed cause a processor to:
    divide a unit of work into a plurality of portions;
    assign each of the plurality of portions to a separate thread of a group of threads;
    assign a first register and a second register to the group, and
    store a first bitmask in a first register and a second bitmask in a second register, wherein a given bit in the first bitmask indicates a corresponding thread of the group of threads has been assigned to execute one of said portions, and a corresponding bit in the second bitmask indicates the corresponding thread has completed execution of its assigned portion;
    each thread of the group of threads providing updates to the second bitmask in the second register; and determine that the unit of work has been completed in response to detecting that for each bit in the first bitmask that corresponds to a thread that is assigned a portion of the plurality of portions, a corresponding bit in the second bitmask indicates its corresponding thread has completed execution of its assigned portion.

17. The non-transitory computer-readable media as recited in claim 16, wherein the processor further comprises a plurality of processor cores and each thread of the group of threads is executed by a separate one of the plurality of cores.

18. The non-transitory computer-readable media as recited in claim 16, wherein to update the second bitmask in the second register, each thread of the group of threads is configured to update its respective bit in the second register in response to completing its assigned portion of the unit of work.

19. The non-transitory computer-readable media as recited in claim 16, wherein the instructions include a single instruction that, when executed, causes the processor to:
monitor the first and second registers; and
return the indication when the unit of work has been completed.

20. The non-transitory computer-readable media as recited in claim 16, further comprising instructions that, when executed, cause the processor to change the first bitmask in response to a reassignment of a portion of the unit of work from a first thread to a second thread.

21. The non-transitory computer-readable media as recited in claim 16, further comprising instructions that, when executed, cause the processor to store additional bitmasks in additional registers for simultaneously synchronizing a plurality of units of work.

* * * * *